April 28, 1964 F. B. ROMERO 3,130,704
BOATS' SPACER

Filed Nov. 28, 1962 8 Sheets-Sheet 1

Witnesses
John R. Rodney
H. H. Laeffler
Hannah E. Dahme

INVENTOR.
F. B. Romero
BY Romero F. B.

April 28, 1964   F. B. ROMERO   3,130,704
BOATS' SPACER

Filed Nov. 28, 1962   8 Sheets-Sheet 2

FIG-2

INVENTOR
BY F. B. Romero

April 28, 1964   F. B. ROMERO   3,130,704
BOATS' SPACER

Filed Nov. 28, 1962   8 Sheets-Sheet 6

United States Patent Office 3,130,704
Patented Apr. 28, 1964

3,130,704
BOATS' SPACER
Frederick Blanchard Romero, 141 W. School House Lane, Philadelphia 44, Pa.
Filed Nov. 28, 1962, Ser. No. 240,666
5 Claims. (Cl. 114—235)

The object of this invention is to provide a new and useful device for connecting marine vessels in tandem. This new and useful device provides numerous new features of considerable utility value which are making possible the induction of new and practical ideas in marine vessels' motions and carrying capacities per voyage. These numerous new features provided include a water-tight sheltered pedestrians' walk-way between the marine vessels connected in tandem; and also, a limited flexibility and resilience which provides finer control of marine vessels being towed, and also finer control of marine vessels engaged in the work providing the power for towing. The vessels engaged in the work providing the power for towing are being equipped with a new and unusually powerful type of driving machinery controlled in part by the use of electronics. The new features provided by this new invention include the sheltered maintenance of flexible power controlling tubes and lines supported between the marine vessels joined in tandem for trans-oceanic services.

A further object of this invention is to improve generally this type of device for connecting marine vessels in tandem.

The description of the constructed forms of this invention is facilitated by the drawings herewith, wherein like structural members are indicated by similar numerals, but not all like structural members are numbered. These drawings include the figures enumerated as follows.

This new invention becomes revealed with considerable clarity by the combined effects of study of these views and the following description of them.

Figures 1, 1A:
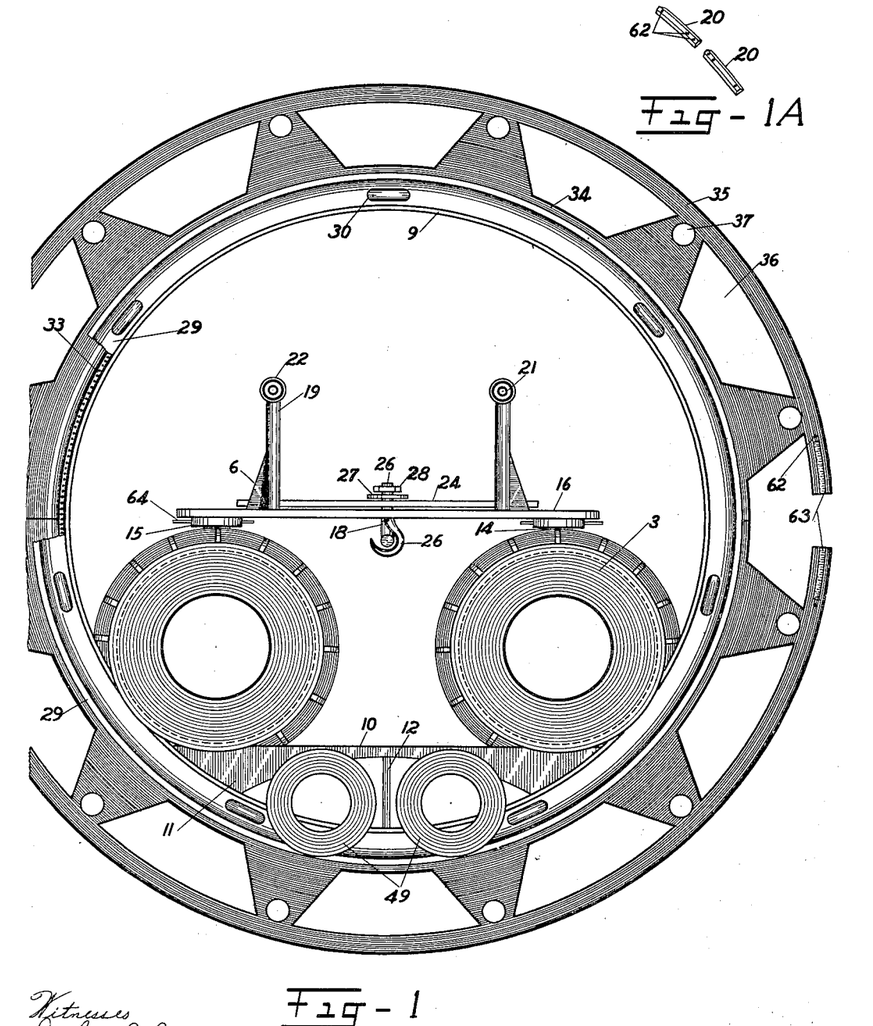
FIG. 1 is a transverse end and partial sectional view of the boats' spacer.
FIG. 1A is a perspective view of the flange connecting means.

The partial end and sectional view revealed by FIG. 1 and the perspective view revealed by FIG. 1A, show some of the essential structure of the marine vessels' spacer. The marine vessels' spacer being made inclusive of non-flexible non-resilient hollow cylindrical portions interposed by flexible and resilient portions; the non-resilient portions as shown by FIGS. 1, 1A, 2, 3, 5, 6, 7, 8, 9, 10, 11, 12, and 13, are made with a variety of properly fitting rigid metal structures, having hollow cylindrical and ring forms, with the inclusion of comparatively soft, yet tough, resilient and water proof coverings 33 and jackets 32, these being made of non-metallic and similar materials.

The rigid structures shown are essentially metallic and they are properly coated with waterproofing materials. These rigid structures as shown are noticeably in the non-resilient portions inclusive of metal hollow cylinders 9 outwardly and at their opposite ends made by welded joints, structurally contiguous with dished metal rings 29 made with concaved and convexed surfaces giving them a somewhat dish like appearance; these surfaces enclosing a curvature made to reduce the abrasive and destructive effects of the spacer's functional motions while the covering 33 extends between and is partially supported by the dished rings 29 as shown in FIG. 3.

Figures 3, 5, 6:
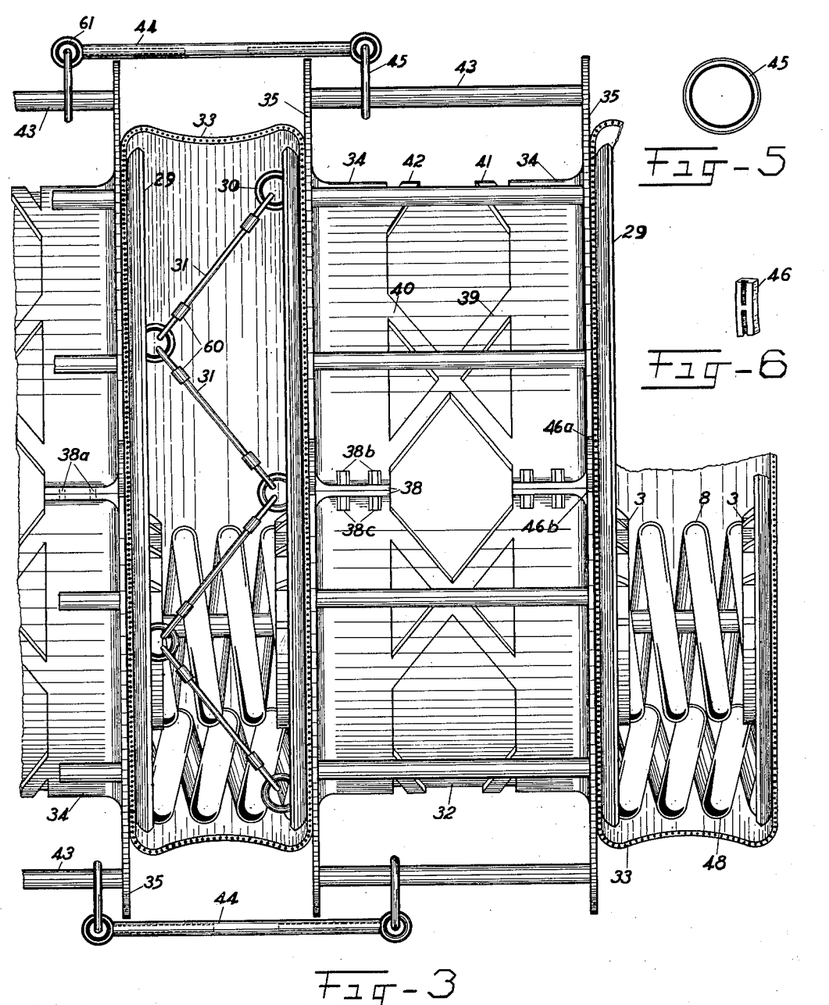
FIG. 3 is a partial side and sectional view of the boats' spacer.
FIG. 5 is an end view of a detail shown in FIG. 3.
FIG. 6 is a perspective view of a connecting means.
Figure 4:
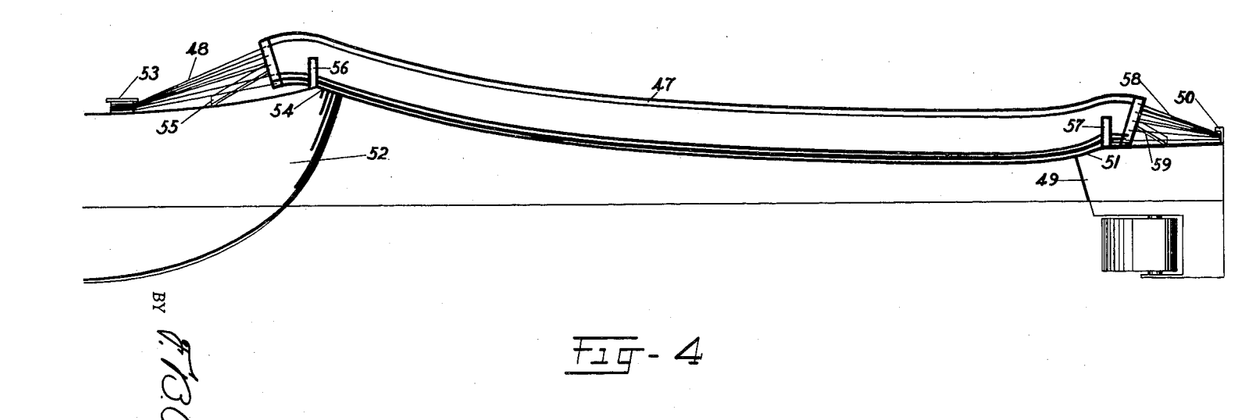
FIG. 4 is a side view of the boats' spacer, and is to be regarded as being entirely diagrammatic.

The marine vessels' spacer in its resilient and flexible portions is considerably protected against possibly destructive effects of torsional motions, by the structural inclusion of torsion resisting cables 31 shown in FIG. 3, where it is seen that properly spaced metal loops 30 are jointed to metal dished rings 29 by welded joints; and these metal loops 30 provide sites for making secure the looped ends of the torsion resisting cables 31 by linked attachment and having their looped ends strengthened by the provision of metal securing clips 60 being held tightly in their places on torsion resisting cables 30 by welded joints.

The coverings 33 extending across the outward parts of the flexible and resilient portions of the marine vessels' spacer, are held in their proper positions on the outward surfaces of cylinders 9, by the bolted together longitudinally separable halves of grid formed (39, 40, 41, 42) hollow cylinders 34 shown in FIG. 3. The coverings 33 are made of comparatively soft, yet tough and resilient materials recognizable as being inclusive of a composition of nylon and rubber having finished edges fitted to the finished edges of jackets 32 of the same material at transverse joints obscured beneath the longitudinally separable halves of hollow grid formed cylinders 34 near the outwardly extending flanges 35 of these grid (39, 40, 41, 42) formed cylinder 34; seen in FIG. 3. The somewhat corrugated coverings 33, and jackets 32, are made with finished edges extending parallel with the longitudinal axes of, and over the outermost surfaces of, hollow cylinders 9; and these edges are made to fit in a close approximation provided by fitting tongue and groove seams supplemented with adhesive materials providing water-tightness.

The flanges 35 extending outwardly from the longitudinally separable hollow grid (39, 40, 41, 42) formed cylinders 34, as shown in FIGS. 1 and 3, are made inclusive of lightening apertures 36; and apertures 37 provided for the fitting and jointing with tubular bars 43 made of metal and welded into their apertures 37 in flanges 35. The tubular bars 43, as shown in FIG. 3, are loosely jointed with the ends of the outermost tubular bars 44 fitted and tightly jointed at their ends with ring-rods 61 having linked through their distal ends, linking rings 45 shown in FIGS. 3 and 5. The loosely arranged linked joints between tubular bars 43 and the ends of tubular bars 44, provide for adequate functionality of the spacer's resilient and flexible joints, and also, provide protection against possibly existing crushing forces imposed by occasional close approximations with stands of piling seen at the corners of docks and wharves made for securing marine vessels in motionless flotation.

The longitudinally separable halves of hollow grid (39, 40, 41, 42) formed cylinders 34, as shown in FIGS. 1 and 3, are made with separable bolted joints held together at the closely approximated surfaces of flanges 38 provided with matched holes 38a, through which extend the threaded bolts 38b properly fitted with threaded nuts 38c, as shown in FIG. 3. The outwardly extending flanges 35, as shown in FIGS. 1 and 3 are made separable at surfaces similar to those indicated as being 46a and 46b being closely approximated by and fitted by the opposite ends of pieces 46 shown in FIG. 6, where the perspective view reveals angular grooves in pieces 46, made to match similarly sized angular grooves 63 shown in FIG. 1; these angular grooves are occupied by properly fitting angular and curved metal bolts 20 made easily slidable in their properly fitting grooves, and function to lock pieces 46 in their places shown in flanges 35, where the bolts 20 are provided with studs 62 making possible a proper securing of the bolts 20 into their proper positions for the variable and wanted possibilities in separation or closure of the approximated sections of flanges 35, as shown in FIGS. 1 and 1A.

The hollow metal cylinders 9 inwardly, by welded joints are made to enclose and are made structurally contiguous with hollow cylinders 1 these being parallel and welded to, and supported partially by the welded into place perforated metal platform 10 being supported beneath its opposite edges by the welded into place metal plates 11, and these being reinforced in their positions by having metal plate 12 welded between them in the position shown by FIGS. 1, 2, 8, and 13, and with the inclusion of an arch in the edge nearest to the inner surfaces of cylinders 9, similar to that of plates 11. The metal hollow cylinders 1 outwardly are reinforced by having welded to them the metal grid shown with most clarity in FIGS. 2, 3 and 9. The cylinders 1, inwardly are made inclusive of a transverse and centrally located partial partition 2, with its structural inclusion of groove 58 shown in FIGS. 2 and 7; the groove being made to hold the removable, resilient padded disc partition 52 shown in FIGS. 11 and 12. Grid reinforced metal cylinders 1 are made by welded joints structurally contiguous with two ring-plates 3, one of these existing at the opposite ends of cylinders 1, as shown in FIGS. 1, 2, 3, 7, 8, 9, and 13. The resilient pads of padded disc partitions 52 are made of a rubber, nylon, and Nyflex composition of excellent durability.

Figure 2:
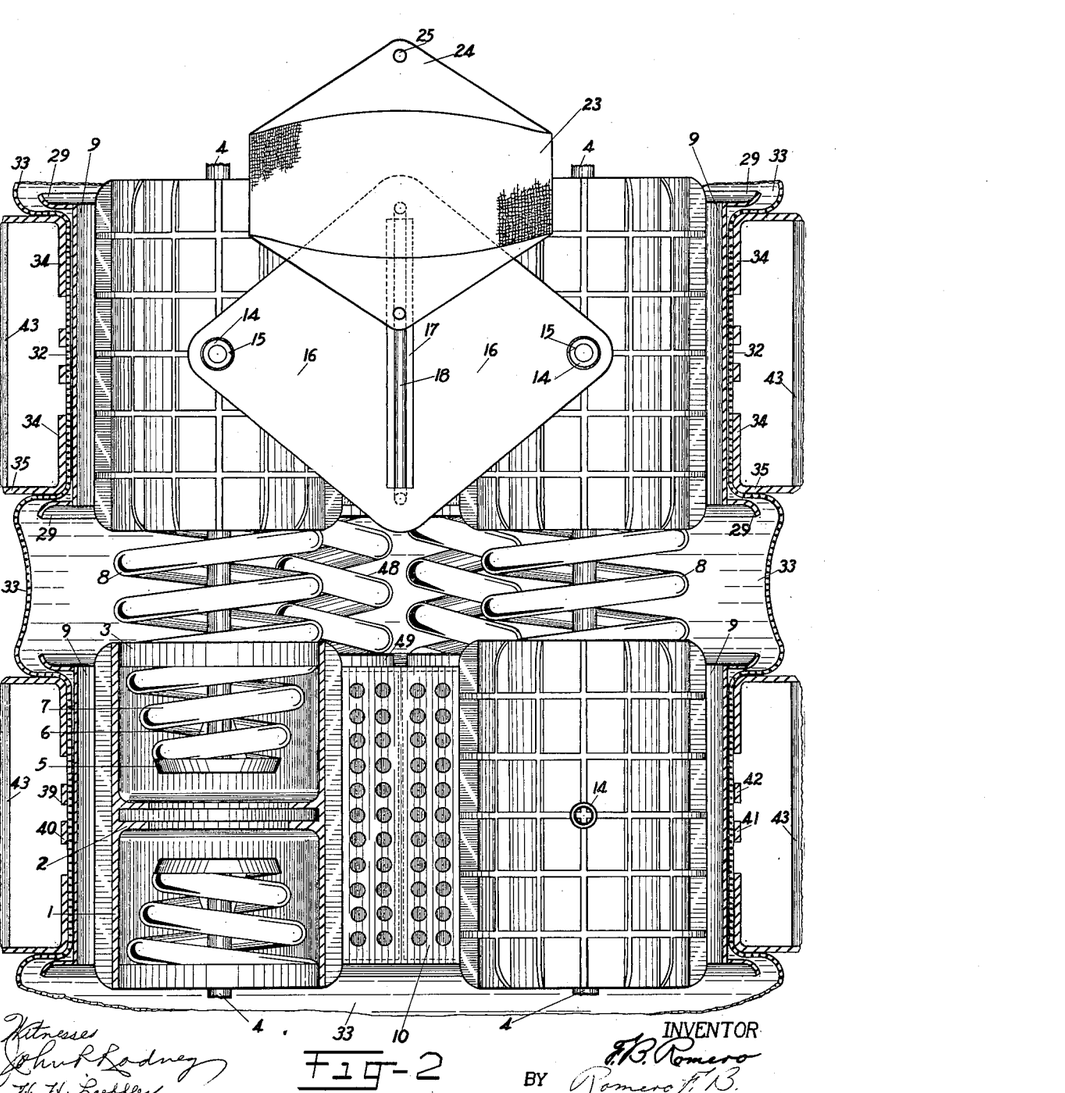
FIG. 2 is a partial plan and sectional view of the boats' spacer.
Figure 7:
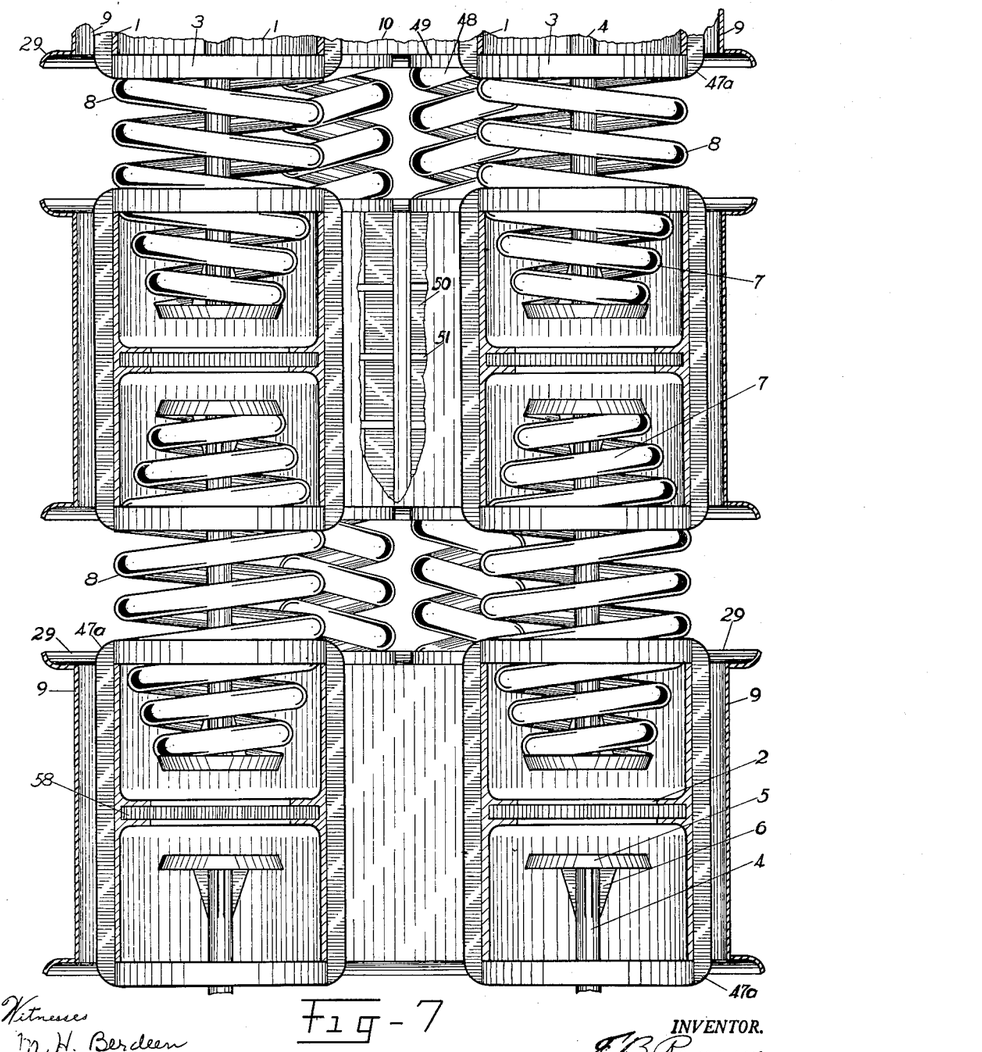
FIG. 7 is a partial plan and sectional view of the boats' spacer.
Figure 8:
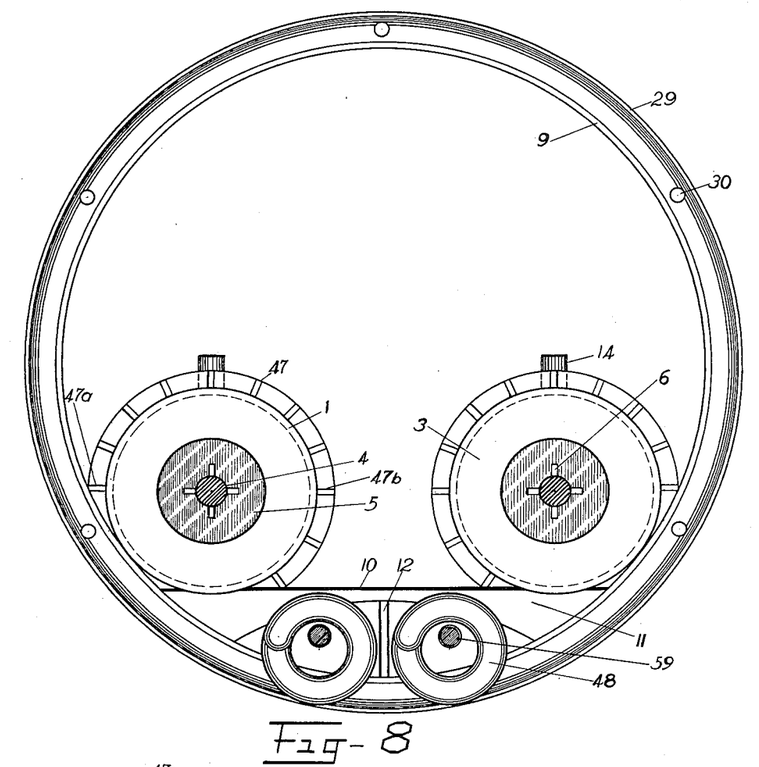
FIG. 8 is an end and partial sectional view of the boats' spacer.
Figure 9:
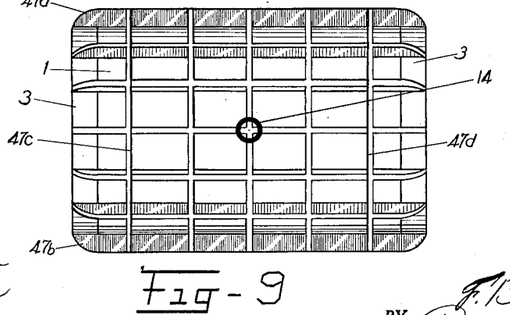
FIG. 9 is a top view of a hollow cylinder.
Figure 10:
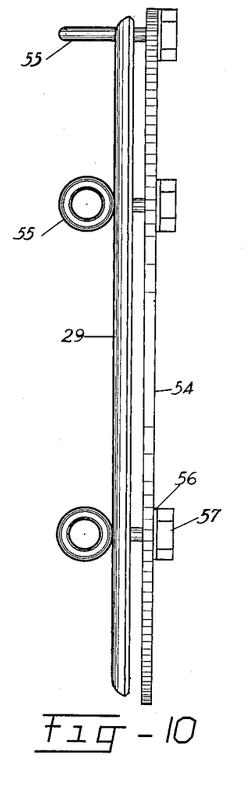
FIG. 10 is a side view of a metal ring.
Figure 11:
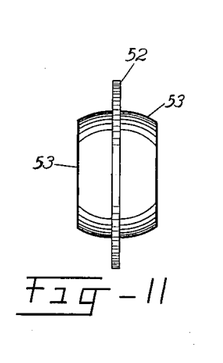
FIG. 11 is a side or top view of a resilient pad.
Figure 12:
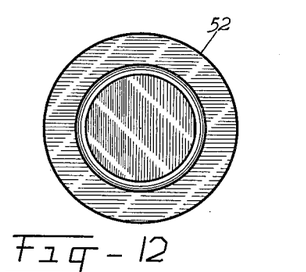
FIG. 12 is an end view of said pad.

The ring-plates 3, as shown by the various figures, provide oppositely positioned bearing surfaces for helical springs 7, and 8; helical springs 7 by being wound on a shaping frustum are made in outline somewhat conical for proper functionality in flexing motions between the non-flexible portions of the spacer shown in FIGS. 2 and 7 wherein are shown also the double headed metal connecting rods 4 having their flat disc metal heads 5 joined to them by welded joints reinforced by welded into place metal brackets 6 as shown in FIG. 7. The double headed connecting rods 4 individually, are made inclusive of a small cylindrical aperture extending through them, centrally and axially, in order that they will have greater strength per square inch following proper treatment. The rod material used to make all the helical springs shown in the various figures (except springs in small model sized structures), are made inclusive of a small cylindrical aperture centrally and axially extended through them in order that they will have greater strength per square inch, following proper treatment. When in motionless positions, the helical springs 7 and 8, have the axes of their helices occupied largely by the connecting rods 4 extending through them as shown in FIGS. 2, 3, and 7. The helical springs 7 and 8, when properly welded to their plates with their obvious bearing surfaces, together with the bearing surfaces of the heads of the double headed connecting rods, as shown in FIGS. 2 and 7, these springs contribute considerably to an ideal combination of tensile and compression strength, flexibility and resilience, of the resilient portions of the marine vessels' spacer. The double headed connecting rods 4, distally and axially have their flat disc-shaped metal heads closely approximated to the outermost and axially perpendicular surfaces of resilient pads 53 of the removable disc partitions 52 shown in FIGS. 11 and 12. The grid reinforced cylinders 1 individually are made with a removable section, making possible the removal of the removable transversely positioned resilient padded disc partition 52; the cylinders' removable section being similar to that indicated in FIGS. 8 and 9, where separable joints are indicated at 47a, 47b, 47c, and 47d.

The marine vessels' spacer, as shown in FIGS. 1, 2, and 7, is obviously strengthened in its provision of resilience and flexibility by the structural inclusion of ring plates 49 providing bearing surfaces for helical springs 48; ring-plates 49 inwardly of hollow cylinders 9 and beneath perforated platforms 10, are properly reinforced by grid flat bars 50 and ring-plates 51, shown in FIG. 7, and being of metal are secured one to another by welded joints. The marine vessels' spacer is provided with supplementary tensile strength by the inclusion of the longitudinally extended and slackened lines 59, shown in FIG. 8, and at their most extremely opposite ends the lines 59 are secured to the vessels joined in tandem.

The grid reinforced cylinders 1, being of metal, have welded into place on their uppermost surfaces, the short hollow cylindrical metal supporting structures 14, shown in FIGS. 1, 2, 8 and 9. The short hollow cylindrical metal supporting members 14, as shown in FIGS. 1 and 2, support a flexible pedestrians' walk-way constructed so as to withstand the functional motions accompanying resilience and flexing of the spacer in utility between marine vessels joined in tandem by the spacer, and maneuvering on rough surfaced seas wherein frequent changes are made in the spacers lengths. The pedestrians' walk-way is made by the support of diamond shaped metal plates 16, fitted to cylinders 14 through welded into place metal rings 15 having diametrically oppositely located holes matching in size and position, similar holes in cylinders 14, for the extension of locking pins 64, shown in FIG. 1. The diamond shaped plates 16, as shown in FIG. 1, are made with a centrally located slot 17 extending parallel with the longitudinal axes of the hollow cylinders 1 and 9; beneath slot 17 is located the welded into place metal rod 18, making possible sliding motions of loosely fitting bolt-hook 26 extending from beneath rod 18, upwardly through slot 17, thence through corner hole 25 of the flexible fibrous mat 23 having its corner holes boxed by the closely fitting sheet metal boxes 24, and above which the extended threaded ends of bolt-hooks 26 are fitted with washers 27 and threaded nuts 28; thereby, a loose but secure sliding joint is made between plates 16, and the hexagon shaped mats 23, extending between the non-flexible portions and extending across the resilient and flexible portions of the marine vessels' spacer, establishing a pedestrians' walk-way easily changed in its lengths as well as being adaptable to flexing motions occurring in a variety of planes and directions. The boxed corners of mats 23 are always placed so as to over lay the rounded corners of diamond shaped metal plates 16 the uppermost surfaces of which, support also, the welded into place metal posts 19 reinforced at their bases by metal brackets 6 as shown FIG. 1. The metal posts 19 support on their uppermost ends, the short hollow cylinders 22 making sleeve joints with the hollow bars 21 secured to and within the short cylinders 22 so as to be easily removable; hollow bars 21 being in their lengths equal to the lengths of the paralleled hollow cylinders 1, and having at their ends attached the ends of easily flexible ropes of such lengths as to be easily adaptable to motions of resilience and flexing occurring between the non-resilient portions of the spacer. The hollow bars 21 and ropes extended between their ends in directions parallel to the longitudinal axes of cylinders 1 and 9, provide a reasonably substantial support for the hands of pedestrians walking on the flexible, and with resilient motions, longitudinally easily changeable pedestrians' walk-way.

Figure 13:
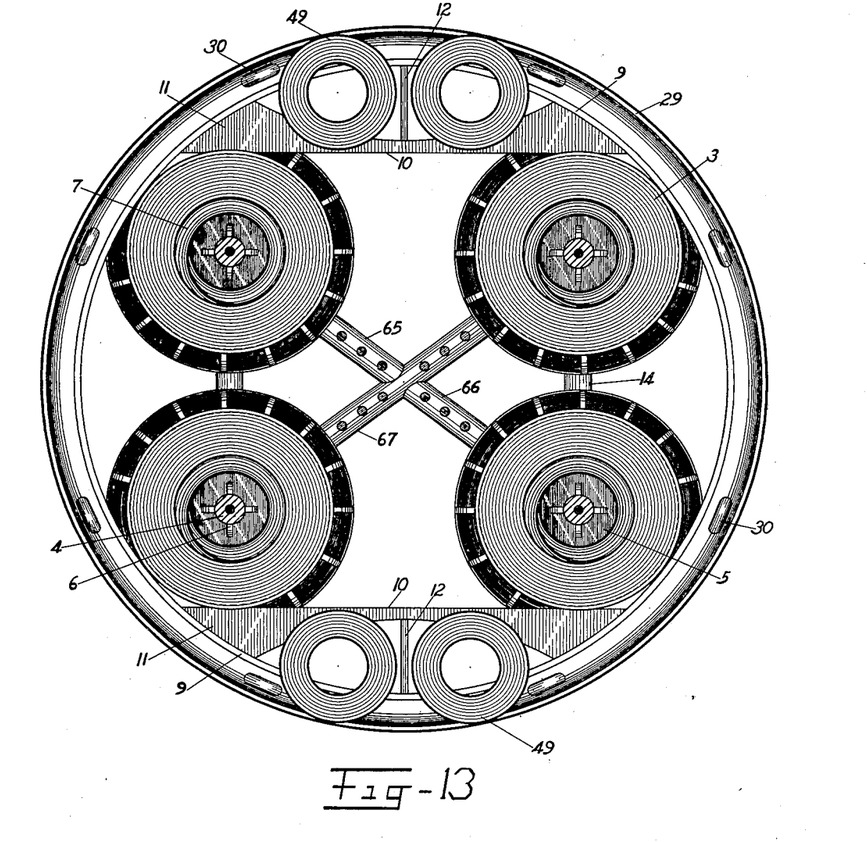
FIG. 13 is an end and partial view of a modification of the spacer.

The marine vessels' spacer when constructed for joining in tandem coast-wise maneuvering marine vessels, it is made according to the construction indicated in FIGS. 1, 1A, 2, 3, 5, 6, 7, 8, 9, 10, 11, and 12, as described in the specification herewith and above. When made for joining in tandem, large marine vessels for trans-oceanic services, the marine vessels' spacer has its structural arrangement made according to the construction indicated by the FIGS. 1, 1A, 2, 3, 5, 6, 7, 8, 9, 10, 11, and 12, combined with the construction indicated in FIG. 13; where crossed perforated metal tubular members 65, 66, 67, when properly jointed by welding to one another and to the metal grid portions of the paralleled cylinders 1, and near the opposite ends of each of the paralleled cylinders 1, where also are located in the same transverse sectional plane members 14, as shown in FIG. 13, an adequate and properly functioning spacer is provided; wherein, the pedestrians' walk-way shown in FIG. 1, is changed in its proportionate dimensions, but similarly constructed, being supported on, and elevated a short distance above, the lower perforated platforms 10. The boats' spacer for marine vessels, is constructed within and according to the scope of the axial and diametrically proportionate dimensions indicated by FIGS. 1, 1A, 2, 3, 5, 6, 7, 8, 9, 10, 11, 12, and 13.

The marine vessels' spacer is provided with a means of attachment to marine vessels being joined in tandem. The means of attachment is revealed with considerable clarity in FIG. 10; where ring plate 54 must be existing in structural contiguity with the marine vessels to which the extremely opposite ends of the spacer are secured; and by use of a plurality of ring-bolts 55 extended through fitting holes in flanges 35, dished rings 29, and ring-plates 54, where the threaded ends of ring-bolts 55 are properly fitted with washers 56 and threaded nuts 57; watertightness is established by the insertion of a comparatively soft gasket (not shown because of its known simplicity of shape and structure) between dished rings 29 and ring-plates 54.

The boats spacer having its rigid cylindrical portions interposed by flexible and resilient portions, is constructed as shown in FIGS. 2, and 7, wherein, it is seen that its resilient portions are inclusive of double headed connecting rods 4, having one of the heads of each connecting rod enclosed in the rigid cylindrical portion by structural contiguity, while the other head is enclosed in the next axially adjacent rigid cylindrical portion by structural contiguity, as shown in FIG. 7.

I claim:

1. A boats' spacer for marine vessels, said boats' spacer being constructed within and according to the scope of indicated axially and diametrically proportionate dimensions, with the inclusion of a plurality of properly fitting and properly joined metal parts, structurally arranged so as to make a marine vessels' spacer formed by alternately spaced portions of hollow cylindrical forms of rigid metal construction interposed by resilient and flexible portions inclusive of helical springs and torsion resisting cables protected by the sheltering effects of corrugated coverings of rubber and nylon composition extended between, said coverings enclosing the ends of said rigid metal hollow cylinders outwardly of which, said corrugated covering being joined to jackets of similar material and held in proper position by hollow flanged and longitudinally separable metal grid formed cylinder parts bolted together at surfaces provided by short longitudinally separable flanges, said flanges being parallel to the longitudinal axes of said hollow cylindrical forms, said grid formed longitudinally separable cylinders being outwardly protected by tubular bars welded at their opposite ends to outwardly extending flanges provided with holes fitting the opposite ends of said tubular bars welded to said flanges, said tubular bars and flanges being loosely linked through linking rings with the ring ends of outermost tubular bars providing said spacer with protection of its flexible and resilient portions against possible existing crushing forces imposed on said spacer.

2. A boats' spacer for marine vessels, constructed within and according to the scope of indicated axially and diametrically proportionate dimensions and extensively in metal properly shaped and properly joined by the use of welded joints establishing structural contiguity between a plurality of properly fitting structural portions inclusive of cylindrical and ring forms together with resilient padded discs held in grooved partial partitions for easy removal, said resilient padded discs having their pads in close proximity to the distal ends of double headed connecting metal rods, said rods being made with greater strength per square inch by the inclusion of a small cylindrical aperture extended axially and centrally through them for proper treatment, said metal connecting rods by welded joints on the surfaces of their disc shaped heads being made structurally contiguous with the opposite ends of helical springs forming a frustum in outline and by welded joints, further made structurally contiguous with the inner surfaces of ring-plates joined by welding to the opposite ends of paralleled cylinders, said cylinders being secured by welded joints to the inner surfaces of and parallel to the axes of larger enclosing cylinders, the outward bearing surfaces of said ring-plates being made by welded joints structurally contiguous with the distal and opposite ends of helical springs having the axes of their helices occupied by the extension of said double headed connecting rods, having one head enclosed in one rigid cylindrical portion of said boats' spacer and the other head enclosed in the next axially adjacent rigid cylindrical portion of said boats' spacer, said spacer being provided at its extreme ends with ring-bolts and gaskets and adequate means for watertight attachment to marine vessels joined in tandem.

3. A boats' spacer constructed within and according to the scope of indicated axial and diametrically proportionate dimensions, and for marine vessels to be joined in tandem, said boats' spacer in its structural forms being made structurally inclusive of a plurality of properly fitting and properly joined metal parts extensively existing in the forms of hollow cylinders and ring-plates providing bearing surfaces for helical springs of metal rod material with greater strength per square inch by having a small cylindrical aperture extending centrally and axially through said metal rod material, said helical springs in plurality being wound on a properly formed frustum being somewhat conical in their outlines and being made by welded joints structurally contiguous with opposite bearing surfaces, one of said bearing surfaces being the inner surface of the flat disc head of a double headed metal connecting rod extending along the axis of the helix of said helical springs and through the apertures of said ring-plates providing on their surfaces the other bearing surfaces for said helical springs welded thereto.

4. A boats' spacer constructed within and according to the scope of indicated axial and diametrically proportionate dimensions, inclusive of double headed connecting rods having their flat disc heads reinforced by brackets welded into place and said connecting rods being made with the inclusion of a small cylindrical aperture extending centrally and axially through them, said spacers are made inclusive of ring-plates which by welded joints are made structurally contiguous with the opposite ends of paralleled cylinders supported on a common perforated platform, said paralleled cylinders and common platform being enclosed within a larger cylinder outwardly jacketed, and by welded joints made structurally contiguous with dished rings at the opposite ends of said larger enclosing cylinder, said dished-rings having metal loops welded to their surfaces for attachment of looped ends of torsion resisting cables providing said spacer with protection against the effects of torsional forces imposed on said spacer.

5. A boats' spacer constructed within and according to the scope of indicated axial and diametrically proportionate dimensions, for marine vessels, said spacer being constructed largely of metal protected with waterproofing materials and made watertight with the inclusion of corrugated coverings and jackets having finished edges approximated in watertight seams, said corrugated coverings and jackets comprising a composition of nylon and rubber, said spacer being inwardly provided with longitudinally extended lines having their extreme ends attached to said marine vessels joined in tandem, said spacer being constructed with the inclusion of rigid portions interposed by flexible and resilient portions, said rigid portions being inclusive of hollow metal cylinders having their longitudinal axes parallel with the longitudinal axis of larger enclosing metal cylinders, said hollow metal cylinders by welded joints being made structurally contiguous at their opposite ends with ring-plates providing bearing surfaces for the opposite ends of the helices of helical springs providing the said flexible and resilient portions of said spacer, said paralleled hollow metal cylinders outwardly being reinforced with grids and inwardly of said larger enclosing cylinders, having the supporting force of their welded joints supplemented by the supporting force of perforated crossed metal tubular members welded into place and located near the opposite ends of said cylinders and also having located near their opposite ends short hollow supporting metal cylinders in the same plane of transverse section as that of said crossed metal tubular members.

No references cited.